Figure 3:
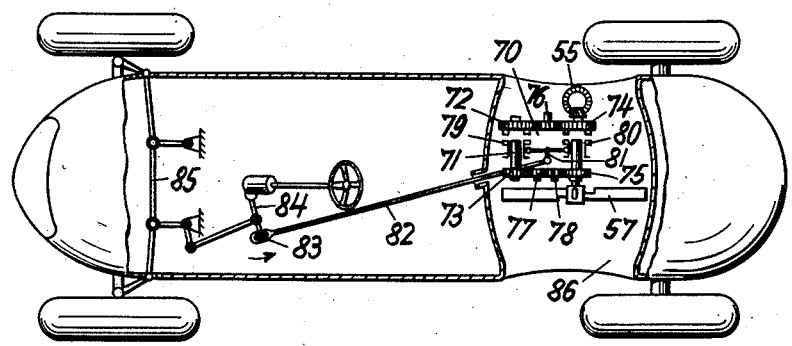

Dec. 17, 1957     L. KRAUS     2,816,615
HIGH SPEED MOTOR VEHICLE
Filed May 17, 1952     2 Sheets-Sheet 1
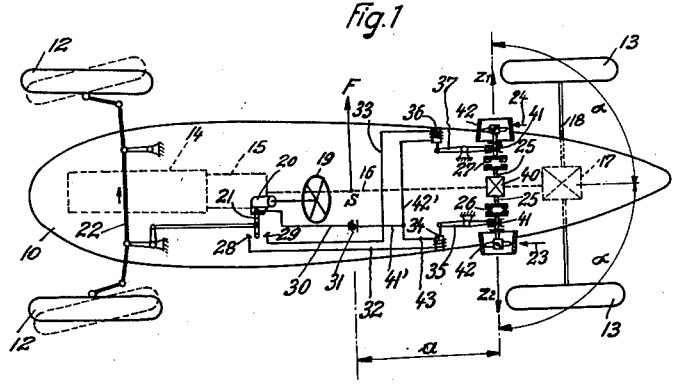
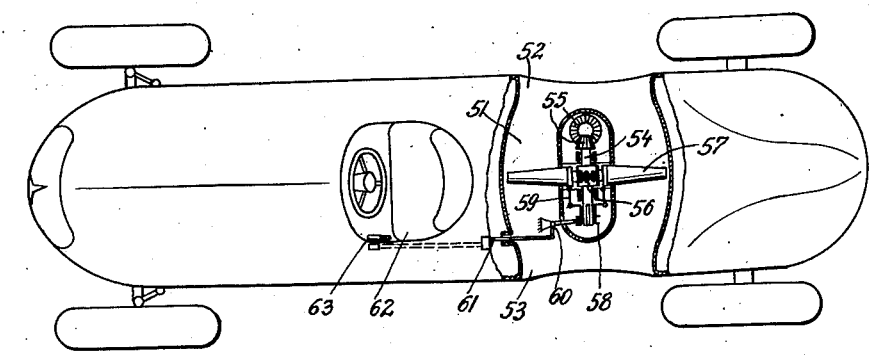
Inventor
Ludwig Kraus
By Kliche and Padlon
Attorneys Dec. 17, 1957  L. KRAUS  2,816,615
HIGH SPEED MOTOR VEHICLE
Filed May 17, 1952  2 Sheets-Sheet 2

INVENTOR
LUDWIG KRAUS

BY Dicke and Padlon

ATTORNEYS.

United States Patent Office 2,816,615
Patented Dec. 17, 1957

2,816,615
HIGH SPEED MOTOR VEHICLE

Ludwig Kraus, Stuttgart-Rotenberg, Germany, assignor to Daimler-Benz Aktiengesellschaft, Stuttgart-Unterturkheim, Germany Application May 17, 1952, Serial No. 288,389

Claims priority, application Germany May 18, 1951

11 Claims. (Cl. 180—1)

My invention relates to a motor-driven vehicle, particularly to a high speed motor vehicle such as a racing car. It is the object of my invention to provide means which will counteract the effect of the centrifugal force acting on the vehicle when the same is driven through a curve thereby enhancing the safety of operation and increasing the speed limit permissible in curves. Another object of my invention is to equip the vehicle with means operative, when the vehicle is driven through a curve, to produce an outwardly directed jet, the reaction of which will brace the body of the vehicle against the effect of the centrifugal force and will thus permit the driver to negotiate curves at higher speeds.

These and other objects are attained by the equipment of the vehicle with engine-driven, jet-producing means capable of issuing a jet towards the right or towards the left and with manually operable means permitting the driver to so control the jet producer as to determine whether the jet will be issued to the right or to the left of the body. Preferably, such manually operable means are constituted by the steering mechanism of the car.

Broadly speaking, the present invention resides in the provision of means capable of producing a transverse force acting on the vehicle and counteracting the centrifugal force, such means being operable by a source of power mounted on the vehicle and, more particularly, by the driving motor of the vehicle, the transverse force being produced by the acceleration by a gaseous medium such as air in a direction transversely of the vehicle, for instance by means of a blower of the propeller type mounted on the vehicle in a transverse position. I may mount either a single reversible blower of the propeller type on the vehicle or I may mount one blower on either side of the vehicle. Further objects of my invention will appear from the detailed description of two preferred embodiments of my invention which are shown on the accompanying drawings, it being understood that such detailed description serves the purpose of explanation rather than that of limitation of the invention. In the drawings:

Fig. 1 is a diagrammatic plan view of a racing car equipped with a pair of jet producers operable by the engine of the vehicle under control of the steering mechanism, Fig. 2 is a plan view of a racing car partly shown in a horizontal section showing a transverse reversible blower and manually operable means for reversing same, and Figure 3 is a diagrammatic plan view of another modification of a racing car equipped with a jet producer and a reversing gear in accordance with the present invention.

The racing car in Fig. 1 has a streamlined body 10 provided with individually spring-suspended steerable front wheels 12 and with rear wheels 13 adapted to be driven by an engine 14 of the piston type through a speed change transmission 15, a transmission shaft 16, a rear axle transmission 17 and rear axle shafts 18. The housing of the rear axle transmission 17 may be mounted on the body 10 and the wheels 13 may be guided for upward and downward motion relative to the body 10 by any suitable means such as swingable half-axles capable of rocking about the axis of shaft 16 in a manner well known in the art, the body 10 being supported on such half-axles by springs.

The steering means of the vehicle comprise a steering wheel 19 located in front of the driver's seat and adapted to operate a steering gear 20 to rock a steering arm 21 connected by a linkage 22 with the swingable front wheel supporting members whereby the front wheels may be swung from the straightened position to an oblique position such as shown in dotted lines in Fig. 1.

When the vehicle is driven through a curve, e. g. a left hand curve, the front wheels being adjusted to the position shown in Fig. 1 in dotted lines for instance, a centrifugal force will act on body 10, the same being indicated by the arrow F pointing to the right from the center of gravity S. For the purpose of bracing the body 10 against the force F or against a centrifugal force acting in the opposite direction, when the vehicle is driven through a right hand curve, I have equipped the vehicle with jet-producing means capable of issuing a lateral jet towards the outside of the curve.

In the embodiment illustrated in Fig. 1, the jet-producing means comprise air feeding means 23 and 24 and means adapted to form lateral jets of air such as nozzles through which the air is discharged in the direction of the arrow Z1 or the arrow Z2. More particularly, the air feeding means comprise blowers 23 and 24 of the axially feeding or propeller type mounted in the body 10 in co-axial relationship, the axis of the blowers extending transversely, i. e. perpendicularly to the vertical longitudinal plane, the two blowers being disposed on either side of said plane. The blowers are driven by means geared to the engine of the vehicle, such means comprising a pair of co-axial transverse shafts 25 geared to shaft 16 by means of a transmission diagrammatically indicated at 40, each shaft 25 being connected with the respective blower shafts 41 by a normally disengaged friction clutch 26 or 27 respectively. Each clutch is electromagnetically controlled, for instance by a solenoid 34 or 36 connected with a clutch-engaging lever 35 or 37 respectively.

Moreover, a controlling mechanism is provided which is connected with the steering means 19, 20 and 21 and is adapted to control the jet-producing device 23, 24 and, when the vehicle is driven through a curve, causes a jet to be issued in outward direction. For this purpose the steering lever 21 is connected by a wire 30 with one terminal of a source of current 31, such as a battery, the other terminal of which is connected by wires 41′, 42′ and 43 with the coils of the solenoids 34 and 36. When the steering wheels 12 are in straightened position the steering lever 21 extends between, but is spaced from, two contacts 28 and 29 mounted in stationary relationship with respect to the body 10. When the steering wheel 19 is turned beyond certain limits from the position shown in Fig. 1, the lever 21 will contact one or the other of the two contacts 28 and 29. The contact 28 is connected with the coil 34 by a wire 32 and the contact 29 is connected with the coil 36 by a wire 33. Therefore, when the vehicle is driven through a curve, a circuit will be closed from the battery 31 via lever 21, one of the two contacts 28, 29 and one of the solenoids 34 and 36 back to the battery 31. The core of solenoid thus energized rocks the clutch-engaging lever 35 or 37 causing it to engage the co-ordinated clutch whereby the respective blower 23 or 24, located on the outside with respect to the curve, will be put in operation and will produce a jet bracing the vehicle against the centrifugal force F. When the vehicle is driven straight ahead, the steering lever 21 contacts neither of the two contacts 28 and 29, leaving both solenoids 34 and 36 in de-energized condition.

Therefore, the friction clutches 26 and 27 are left in disengaged condition in which they are resiliently maintained by springs not shown.

When the driver turns the steering wheel 19 in anticlockwise direction to make a left turn, the lever 21 will be brought to engagement with contact 29 to thereby energize solenoid 36 causing engagement of clutch 27 while clutch 26 is left disengaged. The blower 24 will thus produce a jet indicated at Z1. The reaction acting on the blower is indicated by the arrow Z2. As the blower is mounted on the body 10, the force Z2 will counteract the centrifugal force F acting in the center of gravity S located substantially at the position of the driver's seat in front of the blowers. As a result, a couple will be produced about a vertical axis and this couple will contribute to a reduction or elimination of a swerving tendency of the vehicle when travelling through a curve.

Each of the two blowers 23 and 24 comprises at least one propeller feeding the air in the direction of the axis of shaft 41, the air flowing through a nozzle 42 forming a jet of air.

It will be noted that the jet issuing from either the jet producer 23 or the jet producer 24 is directed at an angle to the vertical central longitudinal plane of a vehicle. While in the embodiment shown that angle amounts to 90°, such angle may differ from that amount. More particularly, the angle α indicated in Fig. 1 may be smaller than 90° and the jet may be inclined to the horizontal.

The racing car illustrated in Fig. 2 has a transverse channel 51 of circular cross section having a larger diameter in the middle and tapering towards its ends so as to form nozzles 52 and 53 whence a jet of air may issue which is produced by a rotary blower of the axially feeding or propeller type comprised of a transverse shaft 54 journalled in suitable bearings and geared by suitable means including a pair of bevel gears 55 to the transmission casing 40 shown in Fig. 1, and further comprised of a hub 56 attached to shaft 54 and provided with a plurality of radially disposed variable pitch propeller blades 57 adapted to be adjusted by axial displacement of a sleeve 58 connected with each of the blades 57 by a link 59. The sleeve 58 is shiftable on shaft 54 by a linkage including a bell crank 60 and a rod 61 which may be connected to a handle 63 mounted near the driver's seat 62. In the latter alternative a turn of the steering wheel 19 beyond a certain limit in one or the other direction will impart rearward or forward motion to the rod 61 whereby the blades 57 will be set to feed air through the channel 51 either from the right to the left or vice versa. Suitable centering means such as springs not shown tend to maintain the rod 61 in a central position in which the blades 57 are feathered so that they will not produce any thrust.

Both embodiments described hereinabove with reference to Figs. 1 and 2 are capable of numerous modifications. Thus the means adapted to reverse the direction of feed by the blower 57 need not be a pitch-controlling device but may be a reversing gear 70 connecting shaft 54 to the source of power such as the engine of the motor vehicle as shown more fully in Figure 3.

In Figure 3, the blower 57, which serves to produce the desired lateral force is driven by the bevel gears 55 over a reversing gear or transmission 70, which produces the drive of the blower alternately in the one or other direction of rotation.

The reversing gear or transmission 70 may be of any well known construction alternately providing the drive in one or the other direction of rotation, and may be provided for that purpose with a countershaft 71, on which are mounted gear wheels 72 and 73. The gear wheels 74 and 75 are mounted on the main shaft. The gear wheels 74 and 72 are operatively connected with each other by an intermediate gear wheel 76, while the gear wheels 73 and 75 are operatively connected with each other by two gear wheels 77 and 78. An alternately operable clutch consisting of jaw clutches 79 and 80 respectively is actuated by a lever 81 which is connected with the steering arm 84 of the steering linkage 85 by means of rod 82 and lost-motion connection 83.

If the vehicle drives through a right hand curve, thereby displacing the steering arm 84 in the direction of the arrow and thereby producing a centrifugal force directed toward the left of the vehicle, then the blower 57 is driven by clutch 80 in such a direction as to produce a jet directed outwardly toward the left whereby the vehicle is pushed inwardly by the reaction force on the blower 57 thereby tending to oppose the centrifugal force to increase the stability of the vehicle while traversing the curve.

If, in contrast thereto, the vehicle drives through a left hand curve, then blower 57 is driven by the clutch 79 in the opposite direction and a jet is issued in the opposite direction.

The reverse gear mechanism with the blower 57 is located in a channel 86, similar to channel 51 of Figure 2, which lies in the immediate proximity of the rear wheels.

Means other than manually operable means may be provided to control the jet producer and, more particularly, the solenoids 34 and 36 such as a fly weight resiliently mounted on the body 10 for transverse motion under the effect of the centrifugal force F and adapted to alternatively close the circuit through contact 28 or contact 29.

Having now described my invention with reference to two preferred embodiments thereof, I wish it to be clearly understood that the same is in no way restricted to the details of such embodiment, but is capable of numerous modifications within the scope of the appended claims.

What I claim is:

1. In a high speed motor vehicle, a jet-producing device including a rotary blower in communication with the external atmosphere and having an axis extending at an angle to the vertical central plane of the vehicle for discharging a jet substantially in the direction of said axis into the external atmosphere to counteract the effect of the centrifugal force acting on said vehicle when the same is driven through a curve.

2. In a high speed motor vehicle, the combination comprising steering means, jet-producing means including at least one rotary blower having an axis extending at an angle to the vertical central plane of the vehicle and adapted to issue a lateral jet alternatively on one or the other side of the vehicle substantially in the direction of said axis, and means controlled by said steering means and connected with said jet-producing means for causing said jet-producing means upon traversal of a curve by said vehicle to issue a jet towards the outside of said curve.

3. In a high speed motor vehicle, the combination comprising a jet-producing device including air feeding means and means forming at least one jet of the air fed for issuing said jet in a lateral direction with respect to the vehicle alternatively on one or the other side thereof, steering means, and a controlling mechanism connected with said steering means for controlling said jet-producing device during traversal of a curve by said vehicle to cause said jet-producing device to direct a jet in outward direction with respect to the curve so as to produce a reaction force counteracting the effect of the centrifugal force upon the vehicle.

4. In a high speed motor vehicle, the combination comprising a right hand jet producer mounted on the vehicle and adapted to issue a jet towards the right at an angle to the vertical central plane of the vehicle, a left hand jet producer mounted on the vehicle and adapted to issue a jet towards the left at an angle to the vertical central plane of the vehicle, steering means, and means controlled by said steering means during traversal of a curve by said vehicle for selecting that one of said jet producers for operation which is co-ordinated with the outside of the curve thereby causing the selected jet producer to exert a reaction force on the vehicle counteracting the effect of the centrifugal force on the vehicle.

5. In a high speed motor vehicle, the combination comprising a right hand jet producer mounted on the vehicle and adapted to issue a jet towards the right at an angle to the vertical central plane of the vehicle, a left hand jet producer mounted on the vehicle and adapted to issue a jet towards the left at an angle to the vertical central plane of the vehicle, each of said jet producers including a blower, driving means geared to the engine of said vehicle, a pair of normally disengaged clutches each adapted to co-operatively connect said driving means with one of said jet producers, clutch-engaging means, steering means, and controlling means connected with said steering means for controlling said clutch-engaging means upon operation of said steering means to steer the vehicle through a curve thereby causing said clutch-engaging means to engage that one of said clutches which is co-ordinated with the jet producer directing its jet to the outside of said curve whereby a reaction force counteracting the effect of the centrifugal force on the vehicle is produced.

6. In a high speed motor vehicle, at least one rotary blower geared to the engine of the vehicle and located between the driver's seat of the vehicle and the rear axle thereof, and means co-operating with said blower during traversal of a curve by said vehicle for operating said blower to direct a jet laterally and outwardly thereby producing a reaction counteracting the effect of the centrifugal force upon the vehicle.

7. In a high speed motor vehicle, a jet producer including a rotary blower geared to the engine of said vehicle and mounted on said vehicle, the axis of said rotary blower extending at right angles to the central vertical plane of the vehicle reversing means for reversing the direction of feed by said blower, steering means, and means connecting said steering means to said reversing means for operating said blower upon driving said vehicle through a curve to direct a jet of air outwardly with respect to said curve to thereby produce a reaction counteracting the effect of the centrifugal force on the vehicle.

8. In a high speed motor vehicle, jet-producing means including a blower having an axis extending at an angle to the vertical central plane of the vehicle geared to the engine of the vehicle and adapted to alternately issue a jet directed outwardly of the vehicle into the external atmosphere to the right or to the left substantially in the direction of said axis to thereby produce a reaction counteracting the effect of the centrifugal force on the vehicle, when the latter is driven through a curve, and manually operable control means for controlling said jet producing means and for determining whether the jet is issued to the right or to the left.

9. In a high speed motor vehicle, the combination comprising a pair of rotary blowers mounted on said vehicle each adapted to produce a jet directed laterally to one side of the vehicle, driving means geared to the engine, a pair of normally disengaged electromagnetically controlled clutches each adapted to connect said driving means to one of said blowers, controlling means for selectively energizing one or the other of said electromagnetically controlled clutches, and steering means for said vehicle co-operatively connected with said controlling means for causing the latter to select that one of said clutches for engagement which is co-ordinated with the blower and directing a jet outwardly with respect to said curve.

10. In a high speed motor vehicle, steering means, engine-driven jet-producing means adapted to alternately issue a jet towards the right or towards the left with respect to the vehicle, and electrical controlling means connected to said steering means for controlling said jet-producing means during traversal of a curve by said vehicle to cause the latter to issue a jet outwardly with respect to said curve.

11. The combination claimed in claim 10 in which said jet-producing means is located between the driver's seat and the rear axle of said vehicle.

References Cited in the file of this patent

UNITED STATES PATENTS

| | | |
|---|---|---|
| 1,037,138 | Dunlavy | Aug. 27, 1912 |
| 1,266,191 | Adsit | May 14, 1918 |
| 1,636,358 | Fairman | July 19, 1927 |
| 2,472,839 | Kramer | June 14, 1949 |
| 2,724,450 | Kamps | Nov. 22, 1955 |

FOREIGN PATENTS

| | | |
|---|---|---|
| 403,730 | France | Oct. 2, 1909 |
| 521,741 | Great Britain | May 30, 1940 |